(12) United States Patent
Kato et al.

(10) Patent No.: US 9,906,849 B2
(45) Date of Patent: Feb. 27, 2018

(54) SOUND-TRANSMITTING WATERPROOF FILM AND METHOD FOR PRODUCING SAME

(71) Applicant: SEIREN CO., LTD., Fukui-shi, Fukui (JP)

(72) Inventors: Yoshiharu Kato, Fukui (JP); Katsumi Sakamoto, Fukui (JP); Yoshiyuki Yamada, Fukui (JP); Naoya Kishimoto, Fukui (JP)

(73) Assignee: Seiren Co., Ltd., Fukui (JP)

( * ) Notice: Subject to any disclaimer, the term of this patent is extended or adjusted under 35 U.S.C. 154(b) by 0 days.

(21) Appl. No.: 15/111,417

(22) PCT Filed: Jan. 8, 2015

(86) PCT No.: PCT/JP2015/000064
§ 371 (c)(1),
(2) Date: Jul. 13, 2016

(87) PCT Pub. No.: WO2015/105052
PCT Pub. Date: Jul. 16, 2015

(65) Prior Publication Data
US 2016/0337737 A1 Nov. 17, 2016

(30) Foreign Application Priority Data
Jan. 13, 2014 (JP) .................................. 2014-003834

(51) Int. Cl.
*H04R 1/08* (2006.01)
*H04R 1/02* (2006.01)
*G01H 15/00* (2006.01)

(52) U.S. Cl.
CPC ............. *H04R 1/086* (2013.01); *G01H 15/00* (2013.01); *H04R 1/023* (2013.01)

(58) Field of Classification Search
CPC .......... H04R 1/086; H04R 1/023; H04R 1/44; H04R 2499/11; H04R 29/001; H04R 29/004
See application file for complete search history.

(56) References Cited

U.S. PATENT DOCUMENTS

| 5,462,586 A | 10/1995 | Sugiyama et al. |
| 2010/0247857 A1 | 9/2010 | Sanami et al. |

(Continued)

FOREIGN PATENT DOCUMENTS

| JP | 7-126428 A | 5/1995 |
| JP | 2009-111993 A | 5/2009 |

(Continued)

*Primary Examiner* — Matthew Eason
(74) *Attorney, Agent, or Firm* — Norris McLaughlin & Marcus, P.A.

(57) ABSTRACT

Provided is a sound-transmitting waterproof film having waterproof performance and stable sound-transmitting performance in a wide tonal range. The sound-transmitting waterproof film includes a porous film of a synthetic resin, and has a water pressure resistance of 10 to 400 kPa in accordance with a JIS L 1092 method B (a high water pressure method) and has an acoustic loss of less than 10 dB at a frequency of 1 kHz, an acoustic loss of less than 5 dB at a frequency of 2 kHz, and an acoustic loss of less than 5 dB at a frequency of 5 kHz in sound-transmitting performance tests.

11 Claims, 2 Drawing Sheets

(56) References Cited

U.S. PATENT DOCUMENTS

| | | |
|---|---|---|
| 2010/0270102 A1 | 10/2010 | Banter et al. |
| 2011/0143114 A1 | 6/2011 | Horie et al. |
| 2013/0333978 A1 | 12/2013 | Abe et al. |
| 2015/0304750 A1* | 10/2015 | Mori .................. H04R 1/023 |
| | | 381/334 |
| 2016/0207006 A1* | 7/2016 | Furuyama ............ H05K 5/0213 |
| 2016/0247499 A1* | 8/2016 | Sanders ................ B32B 5/028 |
| 2016/0249119 A1* | 8/2016 | Mori .................. H04R 1/086 |
| 2016/0301998 A1* | 10/2016 | Abe .................... H04R 1/086 |
| 2017/0006365 A1* | 1/2017 | Mori ...................... G10K 9/22 |
| 2017/0245036 A1* | 8/2017 | Kuki .................. H04R 1/086 |

FOREIGN PATENT DOCUMENTS

| | | |
|---|---|---|
| JP | 2010-193439 A | 9/2010 |
| JP | 2012-011326 A | 1/2012 |
| JP | 2012-195928 A | 10/2012 |
| JP | 2012-525063 A | 10/2012 |

\* cited by examiner

SOUND-TRANSMITTING WATERPROOF FILM AND METHOD FOR PRODUCING SAME

TECHNICAL FIELD

The present invention relates to a sound-transmitting waterproof film having sound-transmitting performance and waterproof performance, and a method for producing the same.

BACKGROUND ART

Electrical and electronic products (hereinafter, simply referred to as "electrical products", but used as a concept that also includes electronic products) such as mobile phones, smartphones, cordless phones, portable media players, portable game devices, digital cameras, and digital video cameras have a sound reception part or a sound production part such as a microphone or a speaker in the housing structure thereof, an opening is provided at each corresponding position, and sound is transmitted through the opening.

As represented by the spread of smartphones, these electrical products are required to have a waterproof structure because scenes of use thereof in outdoor environments are increased. For example, in the smartphones, products generally have waterproof functions in models manufactured by domestic manufacturers and even in models manufactured by Asian manufacturers. Further, even when the products are used at home, it is expected that as electronic equipment becomes portable, the use frequency is increased in water-section environment, and accordingly, the demand for the waterproof structure as a basic design is gradually increasing.

In the related art, a filter having a mesh structure is attached to the openings in the sound production part and the sound reception part from the viewpoint of dustproofing, and the like and in order to secure sound-transmitting performance.

In order to make products waterproof, it is required to make materials for a filter attached to the opening waterproof. Further, it is also important not to hinder sound-transmitting performance, and a sound-transmitting waterproof film is known as a material having sound-transmitting performance while preventing the infiltration of water from the openings to the inside of the housing. For example, Patent Document 1 or 2 proposes a waterproof film including a polytetrafluoroethylene (PTFE) porous film. Further, Patent Document 3 discloses a sound-transmitting waterproof film in which a treatment layer with water repellency is laminated on a resin film having through-holes.

PRIOR ART DOCUMENTS

Patent Document

Patent Document 1: Japanese Patent Laid-Open No. H7-126428
Patent Document 2: Japanese Patent Laid-Open No. 2010-193439
Patent Document 3: Japanese Patent Laid-Open No. 2012-195928

SUMMARY OF THE INVENTION

Problem that the Invention is to Solve

However, a sound-transmitting waterproof film including a polytetrafluoroethylene porous film or a resin film having through-holes is poor in flexibility. For that reason, it may not be expected for sound to be transmitted by vibration of the film, so that there is a problem in that sound-transmitting performance is low in some tonal ranges.

The present invention has been made in view of such circumstances, and an object of the present invention is to provide a sound-transmitting waterproof film having waterproof performance and stable sound-transmitting performance in a wide tonal range.

Means for Solving the Problem

According to the present invention, aspects of the following [1] to [11] are provided.

[1] A sound-transmitting waterproof film including a porous film of a synthetic resin, in which the sound-transmitting waterproof film has a water pressure resistance of 10 to 400 kPa in accordance with a JIS L 1092 B method (a high water pressure method) and has an acoustic loss of less than 10 dB at a frequency of 1 kHz, an acoustic loss of less than 5 dB at a frequency of 2 kHz, and an acoustic loss of less than 5 dB at a frequency of 5 kHz in the following sound-transmitting performance tests.

(Sound-Transmitting Performance Test)

A speaker, a sound-transmitting waterproof film, and a microphone are arranged in this order, a distance between the speaker and the sound-transmitting waterproof film and the distance between the sound-transmitting waterproof film and the microphone are all set to 10±1 mm, a diameter of a sound-transmitting opening of the sound-transmitting waterproof film is set to 3.5 mm, sweep signal sound at each frequency is output from the speaker a sound pressure of which is set to 80 dB at a frequency of 1 kHz, and a sound pressure to detected by the microphone is measured. A difference in sound pressure between the absence of the sound-transmitting waterproof film and the presence of the sound-transmitting waterproof film is defined as an acoustic loss.

[2] The sound-transmitting waterproof film described in [1], in which the synthetic resin is a polyurethane resin.

[3] The sound-transmitting waterproof film described in [1] or [2], in which the porous film of the synthetic resin is a porous film formed by coagulating a synthetic resin solution containing a synthetic resin and a polar organic solvent in water.

[4] The sound-transmitting waterproof film described in [3], in which the synthetic resin solution contains the synthetic resin, 1 to 75 mass % of inorganic fine particles based on the total solid content, and a polar organic solvent.

[5] The sound-transmitting waterproof film described in [4], in which the inorganic fine particles are inorganic fine particles of which surfaces are hydrophobized.

[6] The sound-transmitting waterproof film described in any one of [1] to [5], in which the sound-transmitting waterproof film satisfies IPX5 and IPX7 protection degrees against infiltration of water defined in JIS C 0920.

[7] The sound-transmitting waterproof film described in any one of [1] to [6], in which the sound-transmitting waterproof film has a 10% modulus of 0.3 to 2.0 N/25 mm and a 100% modulus of 0.5 to 5.0 N/25 mm.

[8] The sound-transmitting waterproof film described in any one of [1] to [7], in which the sound-transmitting waterproof film has an elongation of 100 to 500%.

[9] The sound-transmitting waterproof film described in any one of [1] to [8], in which the sound-transmitting waterproof film has an air permeability of 3 to 500 sec/100 mL in accordance with a Gurley method of JIS L 1096.

[10] An electrical product including a housing which includes an opening for a sound reception part or a sound production part, and the sound-transmitting waterproof film described in any one of [1] to [9], which is attached to the opening.

[11] A method for producing the sound-transmitting waterproof film described in any one of [1] to [9], the method including: applying a synthetic resin solution containing a synthetic resin and a polar organic solvent on a releasable substrate, and immersing and coagulating the applied synthetic resin solution in water.

Advantage of the Invention

According to the present embodiment, it is possible to provide a sound-transmitting waterproof film having waterproof performance and stable sound-transmitting performance in a wide tonal range.

MODE FOR CARRYING OUT THE INVENTION

Hereinafter, embodiments of the present invention will be described in detail.

A synthetic resin forming the sound-transmitting waterproof film according to the present embodiment is preferably a polyurethane resin. Examples of the polyurethane resin include polyester-based polyurethane, polyether-based polyurethane, polycarbonate-based polyurethane, and the like, and among them, at least one thereof is preferably used, and further, two or more thereof may be used in mixture.

Here, the polyurethane resin refers to a resin obtained through polymerization reaction of an isocyanate component with a polyol component.

Examples of the isocyanate component include an aliphatic diisocyanate, an aromatic diisocyanate, an alicyclic diisocyanate, and the like, and these may be used either alone or in mixture of two or more thereof. Specific examples of the aliphatic diisocyanate include 1,6-hexamethylene diisocyanate, and the like. Examples of the aromatic diisocyanate include xylylene diisocyanate, 4,4'-diphenylmethane diisocyanate, tolylene diisocyanate, and the like. Examples of the alicyclic diisocyanate include 1,4-cyclohexane diisocyanate, dicyclohexylmethane diisocyanate, isophorone diisocyanate, and the like. Further, a trifunctional or more isocyanate may be used, if necessary.

Meanwhile, examples of the polyol component include: a polyester polyol formed by using polyethylene adipate, polybutylene adipate, polycaprolactone polyol, and the like; a polycarbonate polyol formed by using polyhexamethylene carbonate, and the like; a polyether polyol formed by using polyethylene glycol, polypropylene glycol, polytetramethylene glycol, and the like; and the like. These may be used either alone or in combination of two or more thereof.

Furthermore, various additives may be added to the polyurethane resin, if necessary. Examples of the additive include a water-repellent agent, a crosslinking agent, inorganic fine particles, a plasticizer, an antioxidant, a UV absorber, a smoothing agent such as amide wax, a hydrolysis inhibitor, a pigment, an anti-yellowing agent, a matting agent, and the like.

As the porous film of the synthetic resin, preferred is a porous film formed by coagulating a synthetic resin solution containing a synthetic resin and a polar organic solvent in water. Examples of a method for producing the porous film include a method for preparing a porous film by applying a synthetic resin solution containing the above-described synthetic resin, 1 to 75 mass % of inorganic fine particles based on the total solid content, and a polar organic solvent on one surface of a suitable releasable substrate, and then immersing the applied synthetic resin solution in water to coagulate the synthetic resin.

Here, the synthetic resin solution may include inorganic fine particles of which the surfaces are hydrophobized. The inorganic particles of which the surfaces are hydrophobized have high affinity for a polar organic solvent, and thus is present, in the solution, in a state where the polar organic solvent surrounds the inorganic fine particles of which the surfaces are hydrophobized, and topically, the concentration of the polar organic solvent is increased. For that reason, in a step of immersing the synthetic resin solution in water to coagulate the synthetic resin, pores are formed around the inorganic fine particles of which the surfaces are hydrophobized. By doing this, it is possible to efficiently form a porous film formed of a synthetic resin.

Examples of the inorganic fine particles include: fine particles, such as carbonates such as calcium carbonate and magnesium carbonate; silicic acids such as silicon dioxide and diatomaceous earth; silicates such as talc and zeolite; hydroxides such as aluminum hydroxide and magnesium hydroxide; sulfates such as barium sulfate and calcium sulfate; borates such as aluminum borate and zinc borate; titanates such as potassium titanate; metal oxides such as zinc oxide and titanium oxide; carbonaceous materials such as carbon black; and the like.

The inorganic fine particles may be either porous or nonporous. Further, the shape of the inorganic fine particles may be, but not particularly limited, a regular shape such as polygonal, acicular, spherical, cubic, spindle-shaped, and plate-like, or an irregular shape. The inorganic fine particles may be used either alone or in combination of two or more thereof. Among them, a calcium carbonate particle or a silicon dioxide particle is preferred for the reasons that the adsorption amount of the polar organic solvent such as N,N-dimethylformamide is large, and micropores are easily formed.

The content of the inorganic fine particles varies depending on the type thereof, and thus may not be generalized, but is typically preferably 1 to 75 mass % based on the total solid content of the synthetic resin solution. By a content of 1 mass % or more, a sufficient air permeability is obtained. By a content of 75 mass % or less, the strength of a microporous film obtained, particularly, tensile strength is maintained, and a sufficient waterproof performance is obtained. The content of the inorganic fine particles is preferably 3 to 40 mass % based on the total solid content of the synthetic resin solution.

The sound-transmitting waterproof film according to a preferred embodiment may be prepared by applying, for example, a synthetic resin solution containing a synthetic resin composed mainly of a polyurethane resin, 1 to 75 mass % of inorganic fine particles based on the total solid content, and a polar organic solvent on a releasable substrate.

The releasable substrate used in the present embodiment is not particularly limited, and examples thereof include, for example, a film formed of a resin in itself which has a releasing property (for example, an olefin resin, a silicone resin, and the like. Hereinafter, referred to as a release agent) against the synthetic resin. In addition, examples thereof include a release paper, a release cloth, or a release film obtained by laminating a release layer formed of a release agent on a substrate such as paper, cloth, or a film. Among them, preferred is an olefin resin film or a release film obtained by laminating a release layer formed of an olefin resin on a polyester resin film, from the viewpoint of the releasing property.

Examples of a method for applying a synthetic resin solution to a releasable substrate include a method using, for example, a floating knife coater, a roll-on knife coater, a comma coater, a reverse coater, a lip coater, a roll coater, a die coater, and the like. Among them, for the reason that the synthetic resin solution is stably applicable with a uniform thickness, it is preferred to use a roll-on knife coater, or a comma coater.

The amount of the synthetic resin solution applied is preferably 10 to 1,000 g/m$^2$ and more preferably 10 to 750 g/m$^2$ in terms of the solid content. By setting the application amount within the range, a porous film having a thickness of 10 to 150 μm is obtained. That is, a sound-transmitting waterproof film according to an embodiment has a thickness of 10 to 150 μm.

Subsequent to the step of applying a synthetic resin solution to a releasable substrate, the synthetic resin solution is immersed in water. In this step, the synthetic resin is coagulated by almost completely substituting a polar organic solvent contained in the synthetic resin solution with water along with the water infiltrating the inside of the synthetic resin solution. Furthermore, a coagulation liquid may be only water, and does not need the presence of other components, but in the actual production, as the releasable substrate applied with the synthetic resin solution continuously passes through water (coagulation liquid), the polar organic solvent is gradually accumulated in water (coagulation liquid). In the present invention, it is not intended to exclude the presence of the polar organic solvent in water (coagulation liquid), that is, water in which the polar organic solvent is dissolved is also included in the water in case of "in water."

The immersion time in water is preferably 30 seconds to 10 minutes, and more preferably 1 to 5 minutes. If the immersion time is less than 30 seconds, coagulation of the synthetic resin becomes incomplete and pores are not sufficiently formed, so that there is a concern in that waterproof performance or sound-transmitting performance may not be obtained. If the immersion time exceeds 10 minutes, productivity is lowered.

Subsequently, washing is performed in warm water at 30 to 80° C. for 3 to 15 minutes to remove any remaining polar organic solvent, and then heat treatment is performed at 50 to 150° C. for 1 to 10 minutes to dry the coagulated matter. By doing this, a porous film formed of a synthetic resin is formed on a releasable substrate.

The thus obtained sound-transmitting waterproof film may be subjected to a water-repellent processing as a post-treatment. Accordingly, the waterproof performance may be further improved. Examples of a water-repellent agent used in the water-repellent processing include a paraffin-based water-repellent agent, a silicone-based water-repellent agent, and a fluorine-based water-repellent agent. Among them, a fluorine-based water-repellent agent is preferred from the viewpoint of enabling to impart high water repellency. The water-repellent processing may be performed by a typical method such as a padding method or a spray method.

Figure 1A:
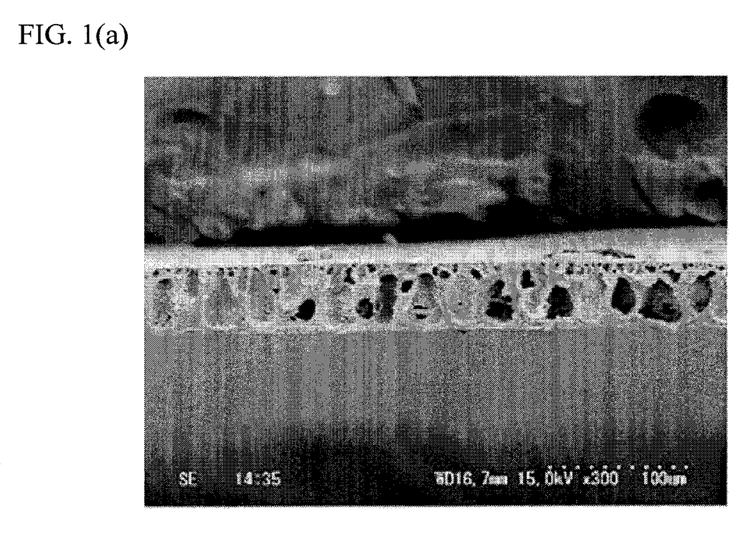
FIGS. 1(a) and 1(b) are electron microscope photographs in which a vertical section of a sound-transmitting waterproof film according to an Example is taken, at 300-fold magnification (FIG. 1(a)) and at 1,000-fold magnification (FIG. 1(b)).
Figure 1B:
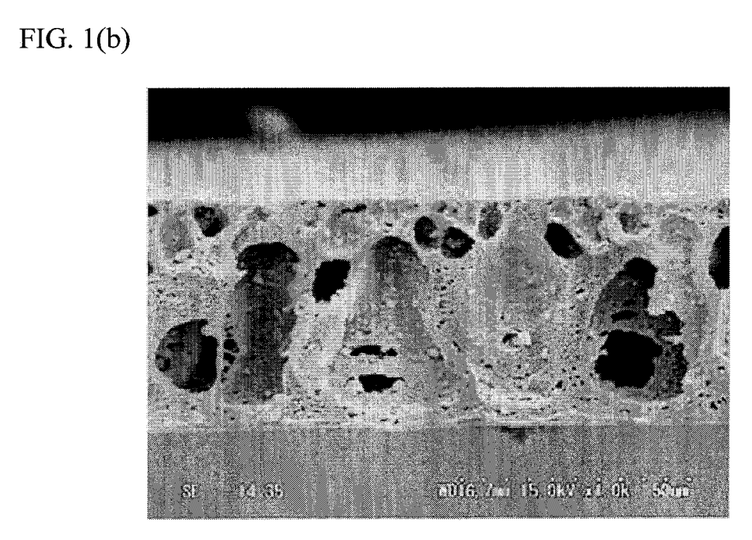

The sound-transmitting waterproof film according to the present embodiment is formed of a porous film of a synthetic resin, and the porosity is preferably 5 to 95%, and more preferably 10 to 95%. When the porosity is 5 to 95%, high sound-transmitting performance and waterproof performance are obtained. FIG. 1 illustrates an electron microscope photograph illustrating the vertical section of the sound-transmitting waterproof film according to an example of the present embodiment.

The water pressure resistance of the sound-transmitting waterproof film according to the present embodiment in accordance with a JIS L 1092 B method (a high water pressure method) is preferably 10 to 400 kPa, and more preferably 30 to 400 kPa. When the water pressure resistance is in a range of 10 to 400 kPa, high sound-transmitting performance and waterproof performance are obtained.

It is preferred that the sound-transmitting waterproof film according to the present embodiment satisfies the IPX5 and IPX7 protection degrees against infiltration of water defined in JIS C 0920. When IPX5 is satisfied, it is possible to withstand a water pressure in a short period of time by flowing water, such as water jet. Further, when IPX7 is satisfied, it is possible to withstand flooding in case of being submerged for a predetermined time.

In the stress of the sound-transmitting waterproof film, it is preferred that a 10% modulus is 0.3 to 2.0 N/25 mm, and a 100% modulus is 0.5 to 5.0 N/25 mm. When the 10% modulus and the 100% modulus are within the ranges, the film is not broken by elongation due to water pressure during the flooding, and the vibration of the film due to sound does not become weak, so that a good sound-transmitting performance is obtained. The 10% modulus is more preferably 0.3 to 1.0 N/25 mm. The 100% modulus is more preferably 0.5 to 4.1 N/25 mm.

When the stress of the sound-transmitting waterproof film exceeds the range, vibration of the film by the sound is attenuated, so that the sound-transmitting performance deteriorates at a frequency in a range of 1 kHz or less. In the related art, since the stress of a PTFE porous film used as a sound-transmitting waterproof film exceeds the range, the sound-transmitting performance deteriorates in a low-frequency region of approximately 1 kHz or less.

The elongation of the sound-transmitting waterproof film is preferably 100 to 500%, and more preferably 150 to 400%. When the elongation is 100 to 500%, it is possible to maintain good sound-transmitting performance and sufficient waterproof performance.

The air permeability of the sound-transmitting waterproof film is preferably 3 to 500 seconds/100 mL, and more preferably 3 to 300 seconds/100 mL, in the JIS L 1096 Gurley method. When the air permeability is 3 to 500 seconds/100 mL, good sound-transmitting performance may be obtained.

The sound-transmitting waterproof film according to the present embodiment has a sound-transmitting performance of an acoustic loss of less than 10 dB at a frequency of 1 kHz, an acoustic loss of less than 5 dB at a frequency of 2 kHz, and an acoustic loss of less than 5 dB at a frequency of 5 kHz.

Figure 2:
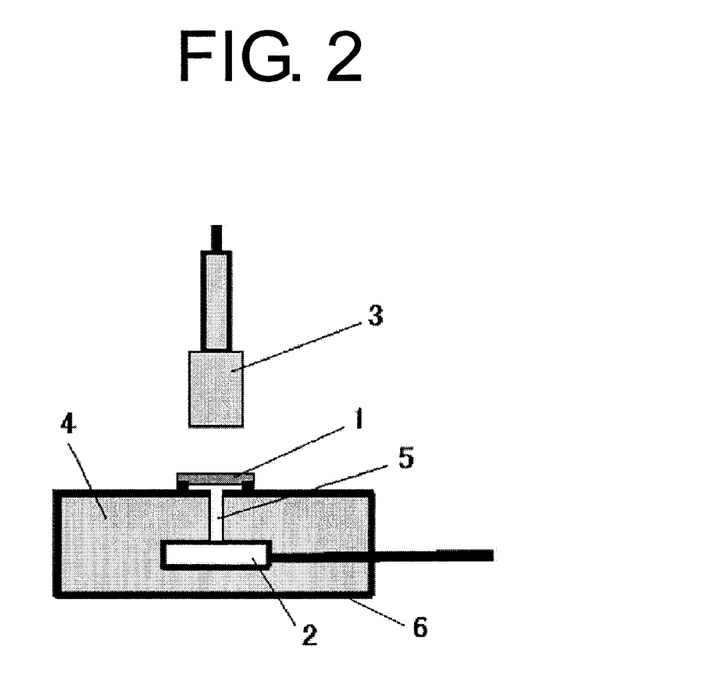
FIG. 2 is a view describing a method of a sound-transmitting performance test.

The sound-transmitting performance test will be described with reference to FIG. 2. An acrylic housing 6 capable of being opened and closed with a length of 70 mm, a width of 50 mm, and a height of 30 mm is prepared, and an opening having a diameter of 2 mm is provided in the housing 6. Subsequently, the inside of the housing 6 is filled with a sound-absorbing material 4, the speaker 2 (manufactured by Star Micronics Co., Ltd.: Small Speaker SCG-16) is disposed inside the sound-absorbing material in the housing 6 so as to obtain a distance of 10±1 mm from the opening of the housing to the speaker. Also, in order to connect the speaker 2 to the housing opening, the sound-absorbing material 4 is provided with a sound-transmitting hole 5 of a diameter of 2 mm for the purpose of sound transmission. Furthermore, the sound-transmitting waterproof film 1 is punched out to a diameter of 5 mm, and a ring-shaped double-sided tape having an outer diameter of 5 mm and an inner diameter of 3.5 mm is affixed to the outer surface of the housing 6 so as to close the opening of the housing. Then, a microphone 3 (BK4193+BK2633 manufactured BK corporation) connected to an acoustic evaluation device (PULSE analyzer Type 3110-C manufactured by BK corporation) is disposed at a position 10±1 mm away from the sound-transmitting waterproof film 1 that closes the housing opening. As a method of measuring the acoustic evaluation, the sound pressure is measured by the SSR measurement (measuring the speaker output by sweep signal sounds from 20 Hz to 20 kHz). The sound pressure at a frequency of 1 kHz when the sound-transmitting waterproof film is not provided is set to 80 dB. Here, the difference between the sound pressure when the sound-transmitting waterproof film is not provided and the sound pressure when the sound-transmitting waterproof film is provided is calculated as the acoustic loss. Further, in the present test method, since the gap between the sound-transmitting waterproof film 1 and the microphone 3 that is a detector is in an open state, the diffusion of sound in a low-frequency region of approximately less than 1 kHz is so remarkable that the value of the measured acoustic loss tends to increase. For that reason, in the present test, the acoustic loss is measured while the frequency is limited to 1 kHz, 2 kHz, and 5 kHz.

When the acoustic loss measured in this manner is within the aforementioned range, it can be said that a high sound-transmitting performance is possessed in a wide tonal range.

The sound-transmitting waterproof film according to the present embodiment, as a preferred embodiment, may be used as a waterproof film to be attached to an opening for a sound reception part or a sound production part provided on the housing thereof in order to make various electrical products, such as the above-described mobile phone or smartphone waterproof. That is, the electrical product according to an embodiment is provided with a housing having an opening for the sound reception part or the sound production part, and the sound-transmitting waterproof film attached to the corresponding opening.

According to the present embodiment carried out as described above, the following operational effects are exhibited. As described above, since the sound-transmitting waterproof film formed of a polytetrafluoroethylene porous film in the related art is poor in flexibility, it may not be expected that sound is transmitted by vibration of the film, and for that reason, there is a problem in that sound-transmitting performance is low in some tonal ranges. Further, when a strong external force is applied, an irreversible deformation is caused, thereby causing abnormalities in the sound-transmitting performance, and in addition, there is a problem in that the sound-transmitting waterproof film is very expensive. In contrast, the sound-transmitting waterproof film of the present embodiment may impart flexibility to the sound-transmitting waterproof film to improve the sound transmission effect due to the vibration of the film. For that reason, waterproof performance and stable sound-transmitting performance are possessed in a wide tonal range. Further, even when the film is subjected to strong external force, deformation may be hardly caused, and accordingly, stable sound-transmitting performance and waterproof performance may be maintained. Furthermore, the sound-transmitting waterproof film may be provided at low costs.

EXAMPLES

Hereinafter, the present invention will be described in more detail with reference to the Examples, but the present invention is not limited to the following Examples. Further, each physical property value in the following Examples and Comparative Examples was measured and evaluated in accordance with the following methods.

(1) Porosity of Sound-Transmitting Waterproof Film

The unit weight $(G)[g/m^2]$ and thickness $(A)[\mu m]$ of the sound-transmitting waterproof film obtained in the following Examples were measured. Subsequently, a nonporous film material to have the unit weight $(G)[g/m^2]$ was separately prepared using the same raw material as that of the sound-transmitting waterproof film, and the thickness (B) $[\mu m]$ was measured. Using these measurement results, the porosity of the sound-transmitting waterproof film porous film material was calculated according to the following equation.

$$\text{The porosity of the sound-transmitting waterproof film } (\%) = 100 \times (A-B)/A$$

(2) Average Pore Diameter of Sound-Transmitting Waterproof Film

A scanning electron microscope (trade name "S-3000N" manufactured by Hitachi High-Technologies Corporation) was used to capture a vertical sectional photograph at 300 to 5,000-fold magnification, and the state of the film material was observed. The number of micropores having the following pore diameter of 10 μm or less was counted using a 1000 to 5000-fold vertical sectional photograph. The number of micropores having the following pore diameter of more than 10 μm was counted using a 300 to 1000-fold vertical sectional photograph. For any range of the obtained image, 100 pore diameters were measured to obtain an average value, and the value was defined as an average pore diameter.

(3) Thickness of Sound-Transmitting Waterproof Film

A scanning electron microscope (trade name "S-3000N" manufactured by Hitachi High-Technologies Corporation) was used to capture a vertical sectional photograph at 300 to 5,000-fold magnification, and the thickness of the film material was measured.

(4) Water Pressure Resistance of Sound-Transmitting Waterproof Film

Measurement was made in accordance with the JIS L 1092 B method (high water pressure method).

(5) Protection Degree of Sound-Transmitting Waterproof Film Against Infiltration of Water Measurement was made in accordance with JIS C0920, and for each of the IPX5 and IPX7, those that satisfied the protection degree were displayed as "O", and those that did not satisfy the protection level as "X".

(6) Stress Value of Sound-Transmitting Waterproof Film

In accordance with JIS L 1096, a test specimen having a width of 25 mm was elongated at a gripping distance of 50 mm and a tensile rate of 150 mm/min to measure the stress value (load) during each elongation of 10% and 100%, that is, a 10% modulus value and a 100% modulus value, respectively. In addition, Autograph AG-IS manufactured by Shimadzu Corporation was used for the measurement. Those that were broken before being elongated to 100% were marked as "broken".

(7) Elongation of Sound-Transmitting Waterproof Film

In accordance with JIS L 1096, a test specimen having a width of 25 mm was elongated at gripping distance of 50 mm and a tensile rate of 150 mm/min to measure the elongation degree at break. In addition, Autograph AG-IS manufactured by Shimadzu Corporation was used for the measurement.

(8) Acoustic Properties (Sound-Transmitting Properties) of Sound-Transmitting Waterproof Film Measurement was made according to the above-mentioned sound-transmitting test method. Measurement was made by punching out the sound-transmitting waterproof film to a diameter of 5 mm, using a ring-shaped double-sided tape having an outer diameter of 5 mm and an inner diameter of 3.5 mm, and affixing the tape to the outer surface of the housing so as to close the opening of the housing.

(9) Air Permeability of Sound-Transmitting Waterproof Film

The measurement was made in accordance with the JIS L 1096 Gurley method. During the measurement, the time taken for 100 mL of air to permeate was measured and recorded in units of (seconds/100 mL). Those that were not air-permeable were marked as "-".

Example 1

First, a polyurethane resin solution formed by the following prescription was prepared.

<Prescription 1>

| | |
|---|---|
| CRISVON MP880PS (manufactured by DIC Corporation, a polycarbonate-based polyurethane resin, solid content of 30 mass %) | 100 parts by mass |
| Leatheroid LU2850M (manufactured by Dainichiseika Color & Chemicals Mfg. Co., Ltd, silica particle dispersion, solid content of 20 mass %) | 25 parts by mass |
| Dilac Black L1584 (manufactured by DIC Corporation, black pigment, solid content of 25 mass %) | 4 parts by mass |
| N,N-dimethylformamide | 42 parts by mass |

Subsequently, a knife-on-roll coater was used to apply the polyurethane resin solution to have a coating thickness on a polyester-based silicone release film (manufactured by Fujimori Kogyo Co., Ltd., 75E-0010DG-2AS), such that the thickness of the resulting sound-transmitting waterproof film would become 50 μm. Subsequently, the film was immersed in water at 20° C. for 1.5 minute to completely coagulate the resin solution. Subsequently, the film was washed in warm water at 50° C. for 5 minutes, and then was dried by heat treatment at 130° C. for 2 minutes. In this manner, the sound-transmitting waterproof film in Example 1 was obtained.

Example 2

A sound-transmitting waterproof film in Example 2 was obtained in the same manner as in Example 1, except that the polyurethane resin solution was applied to have a coating thickness on the polyester-based silicone release film, such that the thickness of the resulting sound-transmitting waterproof film would become 30 μm.

Example 3

A sound-transmitting waterproof film in Example 3 was obtained in the same manner as in Example 1, except that the polyurethane resin solution was applied to have a coating thickness on the polyester-based silicone release film, such that the thickness of the resulting sound-transmitting waterproof film would become 80 μm.

Example 4

A sound-transmitting waterproof film in Example 4 was obtained in the same manner as in Example 1, except that a polyurethane resin solution of the following <Prescription 2> was used.

<Prescription 2>

| | |
|---|---|
| CRISVON MP880PS (manufactured by DIC Corporation, a polycarbonate-based polyurethane resin) | 100 parts by mass |
| Leatheroid LU2850M (manufactured by Dainichiseika Color & Chemicals Mfg. Co., Ltd, silica particle dispersion) | 10 parts by mass |
| Dilac Black L1584 (manufactured by DIC Corporation, black pigment) | 4 parts by mass |
| N,N-dimethylformamide | 44 parts by mass |

Example 5

A sound-transmitting waterproof film in Example 5 was obtained in the same manner as in Example 1, except that a polyurethane resin solution of the following <Prescription 3> was used.

<Prescription 3>

| | |
|---|---|
| CRISVON MP880PS (manufactured by DIC Corporation, a polycarbonate-based polyurethane resin) | 100 parts by mass |
| Leatheroid LU2850M (manufactured by Dainichiseika Color & Chemicals Mfg. Co., Ltd, silica particle dispersion) | 50 parts by mass |
| Dilac Black L1584 (manufactured by DIC Corporation, black pigment) | 4 parts by mass |
| N,N-dimethylformamide | 33 parts by mass |

Example 6

A sound-transmitting waterproof film in Example 6 was obtained in the same manner as in Example 1, except that a polyurethane resin solution of the following <Prescription 4> was used.

<Prescription 4>

| | |
|---|---|
| CRISVON MP120 (manufactured by DIC Corporation, a polycarbonate-based polyurethane resin, solid content of 30 mass %) | 100 parts by mass |
| Leatheroid LU2850M (manufactured by Dainichiseika Color & Chemicals Mfg. Co., Ltd, silica particle dispersion) | 25 parts by mass |

-continued

| | |
|---|---|
| Dilac Black L1584 (manufactured by DIC Corporation, black pigment) | 4 parts by mass |
| N,N-dimethylformamide | 48 parts by mass |

Comparative Example 1

A sound-transmitting waterproof film in Comparative Example 1 was obtained in the same manner as in Example 1, except that a polyurethane resin solution of the following <Prescription 5> was used.
<Prescription 5>

| | |
|---|---|
| Resamine CU4330 (manufactured by Dainichiseika Color & Chemicals Mfg. Co., Ltd., a polycarbonate-based polyurethane resin, solid content of 30 mass %) | 100 parts by mass |
| Leatheroid LU2850M (manufactured by Dainichiseika Color & Chemicals Mfg. Co., Ltd, silica particle dispersion) | 25 parts by mass |

Comparative Example 3

A knife-on-roll coater was used to apply the polyurethane resin solution of the above <Prescription 1> to have a coating thickness on a polyester-based silicone release film (manufactured by Fujimori Kogyo Co., Ltd., 75E-0010DG-2AS), such that the thickness of the resulting film material became 30 μm. Subsequently, the film was dried by heat treatment at 130° C. for 10 minutes. By doing this, a nonporous film in Comparative Example 3 was obtained.

Comparative Example 4

As a sound-transmitting waterproof film, a PTFE-made porous film (Auxiliary film for measuring moisture permeation manufactured by Gore-Tex Japan thickness 20 μm) was used.

For the above-described sound-transmitting waterproof porous film materials obtained in the Examples and the Comparative Examples, the evaluation results are shown in Table 1.

TABLE 1

| | | | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
|---|---|---|---|---|---|---|---|---|---|---|---|---|
| Physical Properties | Film Thickness | (μm) | 50 | 30 | 80 | 50 | 50 | 50 | 50 | 50 | 30 | 20 |
| | Porosity | (%) | 65.8 | 65.6 | 67.2 | 70.2 | 63 | 68 | 64.8 | 40.2 | 0 | 50 |
| | Average Pore Diameter | (μm) | 4.2 | 2.8 | 6.2 | 7.9 | 1.7 | 5.4 | 3.3 | 1.5 | No Pore | 1 |
| | Water Pressure Resistance | (kPa) | 70 | 70 | 70 | 54 | 86 | 46 | 43 | 103 | 200 | 200 |
| | IPX5 | | ○ | ○ | ○ | ○ | ○ | ○ | ○ | ○ | ○ | ○ |
| | IPX7 | | ○ | ○ | ○ | ○ | ○ | ○ | ○ | ○ | ○ | ○ |
| | 10% Modulus | (N/25 mm) | 0.7 | 0.4 | 1 | 0.6 | 0.7 | 0.4 | 2.1 | 2.3 | 2.7 | 2.5 |
| | 100% Modulus | (N/25 mm) | 2.9 | 1.7 | 4.1 | 2.8 | 2.9 | 1.4 | 8.6 | 8.7 | 11.2 | Broken |
| | Elongation Degree | (%) | 220 | 185 | 220 | 230 | 185 | 303 | 160 | 192 | 305 | 72 |
| | Air Permeability | (sec/100 mL) | 145 | 105 | 180 | 140 | 46 | 30 | 150 | 102 | — | 5 |
| Acoustic Loss Film Opening φ3.5 | 1 kHz | (dB) | 6 | 1 | 8 | 4 | 4 | 0 | 25 | 12 | 23 | 20 |
| | 2 kHz | (dB) | 0 | 0 | 0 | 0 | 0 | 0 | 0 | 0 | 6 | 0 |
| | 5 kHz | (dB) | 0 | 0 | 1 | 0 | 0 | 0 | 1 | 0 | 11 | 1 |

-continued

| | |
|---|---|
| Dilac Black L1584 (manufactured by DIC Corporation, black pigment) | 4 Parts by mass |
| N,N-dimethylformamide | 42 parts by mass |

Comparative Example 2

A sound-transmitting waterproof film in Comparative Example 2 was obtained in the same manner as in Example 1, except that a polyurethane resin solution of the following <Prescription 6> was used.
<Prescription 6>

| | |
|---|---|
| Resamine CU4330 (manufactured by Dainichiseika Color & Chemicals Mfg. Co., Ltd, a polycarbonate-based polyurethane resin) | 100 parts by mass |
| Leatheroid LU2850M (manufactured by Dainichiseika Color & Chemicals Mfg. Co., Ltd, silica particle dispersion) | 120 parts by mass |
| Dilac Black L1584 (manufactured by DIC Corporation, black pigment) | 4 pars by mass |
| N,N-dimethylformamide | 10 parts by mass |

DESCRIPTION OF REFERENCE NUMERALS AND SIGNS

1: Sound-transmitting waterproof film, 2: Speaker, 3: Microphone, 4: Sound-absorbing material, 5: Sound-transmitting hole

The invention claimed is:

1. A sound-transmitting waterproof film comprising a porous film of a synthetic resin, wherein the sound-transmitting waterproof film has a water pressure resistance of 10 kPa to 400 kPa in accordance with a JIS L 1092 method B (a high water pressure method) and has an acoustic loss of less than 10 dB at a frequency of 1 kHz, an acoustic loss of less than 5 dB at a frequency of 2 kHz, and an acoustic loss of less than 5 dB at a frequency of 5 kHz in sound-transmitting performance tests comprising a speaker, a sound-transmitting waterproof film, and a microphone are arranged in this order,
wherein
a distance between the speaker and the sound-transmitting waterproof film and a distance between the sound-transmitting waterproof film and the microphone are all set to 10 mm±1 mm,
a diameter of a sound-transmitting opening of the sound-transmitting waterproof film is set to 3.5 mm,
sweep signal sound at each frequency is output from the speaker a sound pressure of which is set to 80 dB at a frequency of 1 kHz, and a sound pressure detected by the microphone is measure, and a difference in sound pressure between absence of the sound-transmitting waterproof film and presence of the sound-transmitting waterproof film is defined as the acoustic loss.

2. The sound-transmitting waterproof film according to claim 1, wherein the synthetic resin is a polyurethane resin.

3. The sound-transmitting waterproof film according to claim 1, wherein the porous film of the synthetic resin is a porous film formed by coagulating a synthetic resin solution containing a synthetic resin and a polar organic solvent in water.

4. The sound-transmitting waterproof film according to claim 3, wherein the synthetic resin solution contains the synthetic resin, 1 mass % to 75 mass % of inorganic fine particles based on a total solid content, and the polar organic solvent.

5. The sound-transmitting waterproof film according to claim 4, wherein the inorganic fine particles are inorganic fine particles of which surfaces are hydrophobized.

6. The sound-transmitting waterproof film according to claim 1, wherein the sound-transmitting waterproof film satisfies IPX5 and IPX7 protection degrees against infiltration of water defined in JIS C 0920.

7. The sound-transmitting waterproof film according to claim 1, wherein the sound-transmitting waterproof film has a 10% modulus of 0.3 N/25 mm to 2.0 N/25 mm and a 100% modulus of 0.5 N/25 mm to 5.0 N/25 mm.

8. The sound-transmitting waterproof film according to claim 1, wherein the sound-transmitting waterproof film has an elongation of 100% to 500%.

9. The sound-transmitting waterproof film according to claim 1, wherein the sound-transmitting waterproof film has an air permeability of 3 sec/100 mL to 500 sec/100 mL in accordance with a Gurley method of JIS L 1096.

10. An electrical product comprising a housing which comprises an opening for a sound reception part or a sound production part, and the sound-transmitting waterproof film according to claim 1, which is attached to the opening.

11. A method for producing the sound-transmitting waterproof film according to claim 1, the method comprising:
applying a synthetic resin solution containing a synthetic resin and a polar organic solvent on a releasable substrate, and
immersing and coagulating the applied synthetic resin solution in water.

* * * * *